US009006309B2

(12) United States Patent
Sumiyoshi et al.

(10) Patent No.: US 9,006,309 B2
(45) Date of Patent: Apr. 14, 2015

(54) AGITATING AND MIXING DEVICE AND METHOD FOR PRODUCING SEMICONDUCTOR SEALING RESIN COMPOSITION

(75) Inventors: Takafumi Sumiyoshi, Tokyo (JP); Hiroshi Shibata, Tokyo (JP)

(73) Assignee: Sumitomo Bakelite Company Limited, Tokyo (JP)

( * ) Notice: Subject to any disclaimer, the term of this patent is extended or adjusted under 35 U.S.C. 154(b) by 335 days.

(21) Appl. No.: 13/574,800

(22) PCT Filed: Feb. 2, 2011

(86) PCT No.: PCT/JP2011/052159
§ 371 (c)(1),
(2), (4) Date: Jul. 24, 2012

(87) PCT Pub. No.: WO2011/102223
PCT Pub. Date: Aug. 25, 2011

(65) Prior Publication Data
US 2012/0289623 A1 Nov. 15, 2012

(30) Foreign Application Priority Data
Feb. 19, 2010 (JP) ................................. 2010-034899

(51) Int. Cl.
*B01F 7/26* (2006.01)
*B01F 11/00* (2006.01)
(Continued)

(52) U.S. Cl.
CPC ......... *B01F 11/0002* (2013.01); *B01F 7/00083* (2013.01); *B01F 7/26* (2013.01); *B01F 11/008* (2013.01); *B01F 11/0017* (2013.01); *B01F 11/0068* (2013.01); *B29B 7/08* (2013.01)

(58) Field of Classification Search
None
See application file for complete search history.

(56) References Cited

U.S. PATENT DOCUMENTS 3,215,409 A * 11/1965 Porciello ........................ 416/76
3,539,117 A * 11/1970 Sjogren ......................... 241/172
3,550,657 A * 12/1970 Swanke ..................... 241/199.1
(Continued)

FOREIGN PATENT DOCUMENTS

JP 61-174935 A 8/1986
JP 62-39839 U 3/1987
(Continued)

OTHER PUBLICATIONS

Notice of Refusal issued Jun. 3, 2014, in Japanese Patent Application No. 2010-034899, with English translation.
International Search Report issued in PCT/JP2011/052159, mailed on Mar. 8, 2011.

*Primary Examiner* — Robert C Boyle
(74) *Attorney, Agent, or Firm* — Birch, Stewart, Kolasch & Birch, LLP

(57) ABSTRACT

An agitating and mixing device 1 of the present invention includes a container 2 for storing the composition, an agitating member 3 for agitating the composition, which is inserted in the container 2, and a driving device 4 for vibrating the container 2. The agitating member 3 has a rod-like portion 32 having one end portion and another end portion, a plate-like portion 31 provided on the one end portion of the rod-like portion 32 and the grip portion 33 provided on the other end portion of the rod-like portion 33. The plate-like portion 31 is perpendicular to the rod-like portion 32. The agitating member 3 is configured to agitate the composition by spacing the plate-like portion 31 apart from the bottom surface of the container 2.

10 Claims, 5 Drawing Sheets

(51) Int. Cl.
 *B01F 7/00* (2006.01)
 *B29B 7/08* (2006.01)

(56) References Cited

U.S. PATENT DOCUMENTS

| | | | |
|---|---|---|---|
| 3,894,721 A * | 7/1975 | Boenisch | 366/108 |
| 4,732,487 A * | 3/1988 | Pollard | 366/112 |
| 5,176,446 A * | 1/1993 | Chiba et al. | 366/114 |
| 6,450,680 B1 * | 9/2002 | Bertolotti et al. | 366/141 |
| 6,572,262 B1 * | 6/2003 | Russel-Smith | 366/348 |

FOREIGN PATENT DOCUMENTS

| | | |
|---|---|---|
| JP | 64-38133 A | 2/1989 |
| JP | 2-107325 A | 4/1990 |
| JP | 9-36149 A | 2/1997 |
| JP | 2003-105094 A | 4/2003 |
| JP | 2006-187873 A | 7/2006 |
| JP | 2007-190905 A | 8/2007 |

\* cited by examiner

AGITATING AND MIXING DEVICE AND METHOD FOR PRODUCING SEMICONDUCTOR SEALING RESIN COMPOSITION

The present invention relates to an agitating and mixing device and a method for producing semiconductor sealing resin composition.

BACKGROUND OF THE INVENTION

There is known a semiconductor package in which a semiconductor chip (semiconductor element) is covered (sealed) with a resin-made sealing material. The sealing material for the semiconductor package is produced by molding a resin composition, for example, with a transfer molding method.

A process for producing the resin composition includes a mixing process of a resin composition (a composition) including plural kinds of pulverized materials. Each of the pulverized materials has a different specific gravity. For example, the mixing process of the resin composition is performed by a mixing device, such as a high speed mixer, a Lodige mixer, a henschel mixer or the like, which rotates a rotating blade at high speed (for example, see patent document 1). The above mixing devices for high speed agitation include a container and a rotating blade rotatably provided in the container of the mixing device. The resin composition is mixed by rotating the rotating blade in a state that the resin composition is stored in the container of the mixing device.

In the conventional mixing device such as described above, pulverized resin compositions is mixed by rotating the rotating blade at high speed. Therefore, there is a case in that the rotating blade scratches an inner surface of the container. As a result, the conventional mixing device suffers from a problem in that metallic foreign substances (foreign metals) are mixed into the resin composition, which leads to a short circuit and so forth when the semiconductor chip is sealed by the resin composition produced using the conventional mixing device.

For this reason, it is preferable to use a vibration type mixing device, such as a paint shaker and so forth, which mixes the resin composition by vibrating the container in which the resin composition is stored. This makes it possible to prevent (inhibit) the metallic foreign substances from being mixed into the resin composition during mixing.

However, in case of using the paint shaker, there is a problem in that it takes a long time to mix the resin composition.

Patent document 1: JP 2003-105094A

SUMMARY OF THE INVENTION

It is an object of the present invention to provide an agitating and mixing device and a method for producing a semiconductor sealing resin composition, which are capable of preventing metallic foreign substances from being mixed into a resin composition and reducing a mixing time for mixing the resin composition.

In order to achieve the object, one aspect of the present invention is directed to an agitating and mixing device for mixing a composition containing plural kinds of pulverized materials, each of the pulverized materials having a different specific gravity, the agitating and mixing device comprising:

a container for storing the composition;

an agitating member for agitating the composition, the agitating member inserted in the container; and a driving device for vibrating the container, wherein the agitating and mixing device is configured to agitate the composition stored in the container using the agitating member and then to mix the composition by vibrating the container using the driving device.

In the agitating and mixing device of the present invention, it is preferred that the agitating and mixing device comprises two or more of the agitating member. In the agitating and mixing device of the present invention, it is preferred that the container has a bottom surface and each of the agitating members has a plate-like portion having a same shape as a shape of a piece which could be obtained by dividing a plate-like member having the same shape and size as the bottom surface of the container into plural pieces.

In the agitating and mixing device of the present invention, it is preferred that the agitating member has a plate-like portion.

In the agitating and mixing device of the present invention, it is preferred that the agitating member is configured to agitate the composition by spacing the plate-like portion apart from the bottom surface of the container.

In the agitating and mixing device of the present invention, it is preferred that each of the agitating members has a rod-like portion having one end portion and another end portion, and the plate-shape portion of each of the agitating members is provided on the one end portion of the rod-like portion of each of the agitating members.

In the agitating and mixing device of the present invention, it is preferred that the plate-shape portion of each of the agitating members is perpendicular to the rod-like portion of each of the agitating members.

In the agitating and mixing device of the present invention, it is preferred that the driving device is configured to simultaneously vibrate the container in at least two directions.

In the agitating and mixing device of the present invention, it is preferred that at least an inner surface of the container is constituted of a nonmetallic material.

In the agitating and mixing device of the present invention, it is preferred that at least an outer surface of the agitating member is constituted of a nonmetallic material.

In the agitating and mixing device of the present invention, it is preferred that the composition contains a resin particle and an inorganic particle as the plural kinds of pulverized materials.

In the agitating and mixing device of the present invention, it is preferred that the composition is stored in the container in a state that the composition is separated into a first layer containing a resin particle and a second layer containing an inorganic particle.

In order to achieve the object, another aspect of the present invention is directed to a method for producing a semiconductor sealing resin composition, the method comprising:

agitating a composition stored in a container using an agitating member, the composition containing plural kinds of pulverized materials and each of the pulverized materials having a different specific gravity; and mixing the composition by vibrating the container.

In the method of the present invention, it is preferred that the container has a bottom surface, the agitating member has a plate-like portion and the agitating member is configured to agitate the composition by spacing the plate-like portion apart from the bottom surface of the container.

In the method of the present invention, it is preferred that the container is simultaneously vibrated in at least two directions.

In the method of the present invention, it is preferred that the composition is stored in the container in a state that the composition is separated into a first layer containing a resin particle and a second layer containing an inorganic particle.

In the method of the present invention, it is preferred that the composition is uniformly mixed.

In the method of the present invention, it is preferred that when six samples of the composition are respectively picked out from six different points of the composition after mixing, each of the samples having a weight of 3 g, and then each of the samples is burned to an ash, a standard deviation of weight fraction among the ashes is less than 0.2.

DETAILED DESCRIPTION OF THE PREFERRED EMBODIMENTS

Hereinbelow, an agitating and mixing device and a method for producing a semiconductor sealing resin composition according to the present invention will be described in detail based on the preferred embodiments shown in the accompanying drawings.

Figure 1:
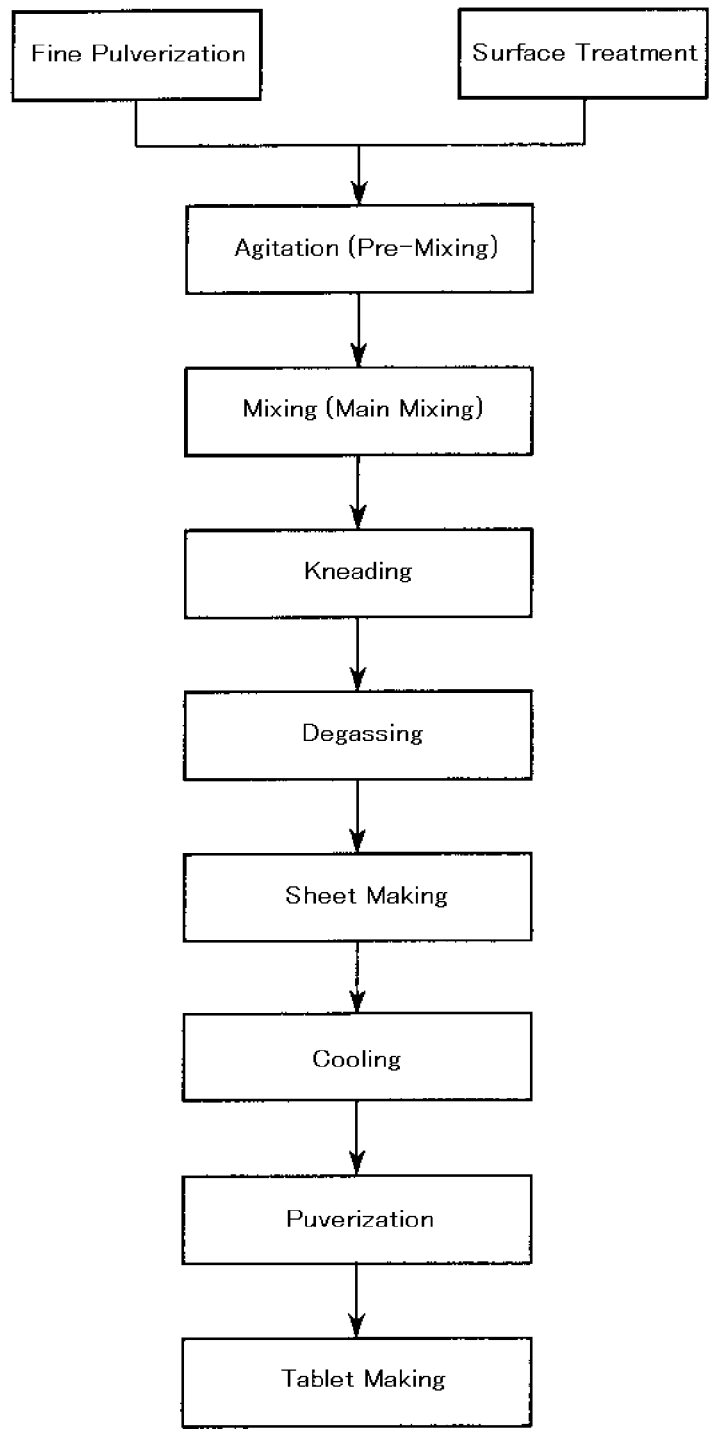
FIG. 1 is a view showing a producing process of a resin composition.
Figure 2:
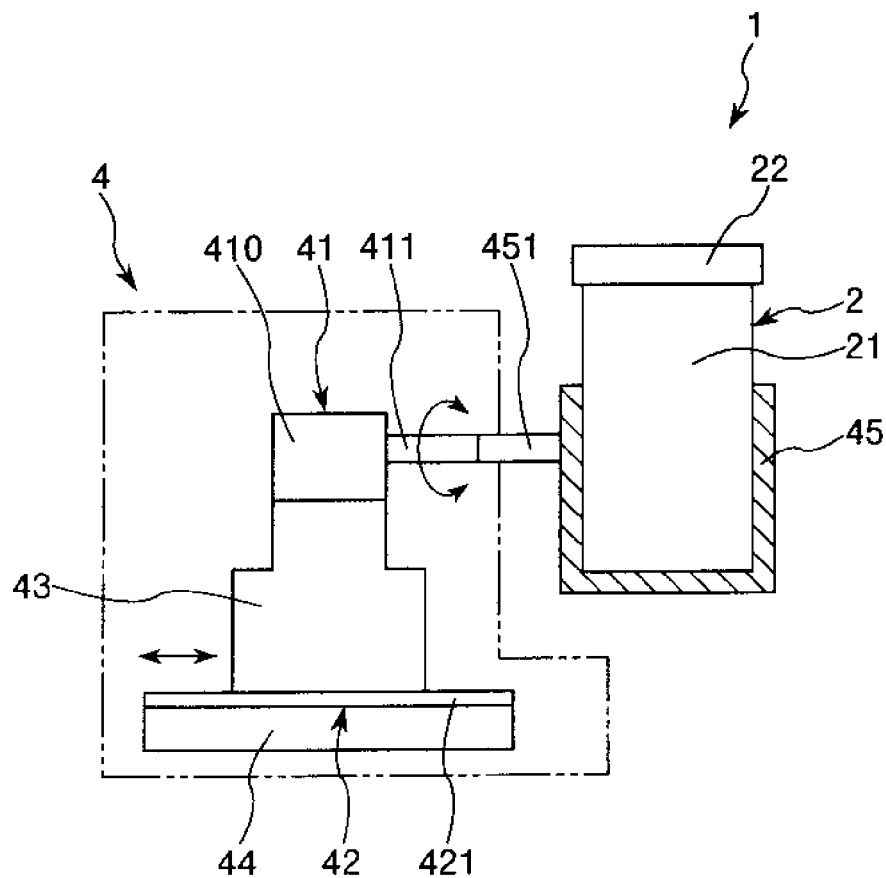
FIG. 2 is a side view (partial cross section view) showing an agitating and mixing device according to one embodiment of the present invention.
Figure 3:
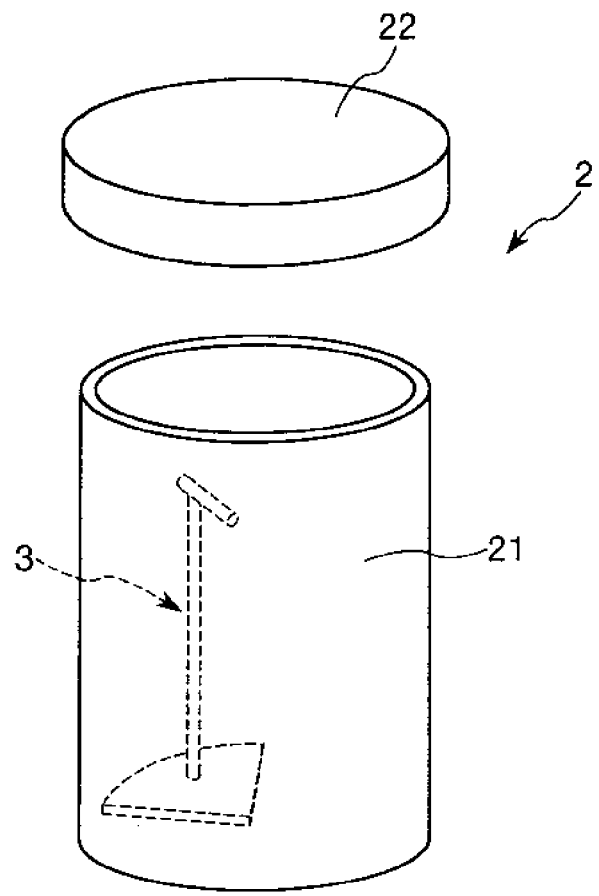
FIG. 3 is a perspective view showing the agitating and mixing device shown in FIG. 1.
Figure 4:
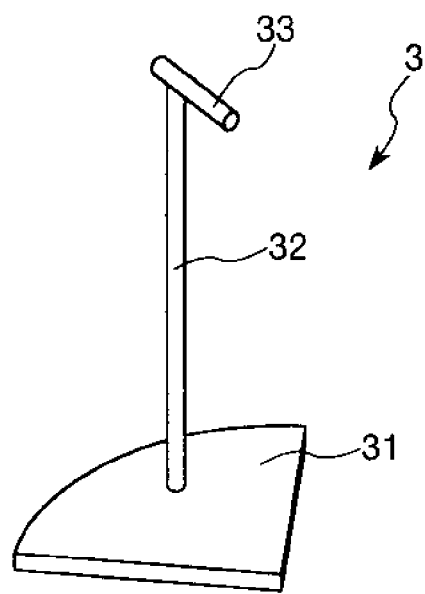
FIG. 4 is a perspective view showing an agitating member of the agitating and mixing device shown in FIG. 1.
Figure 5:
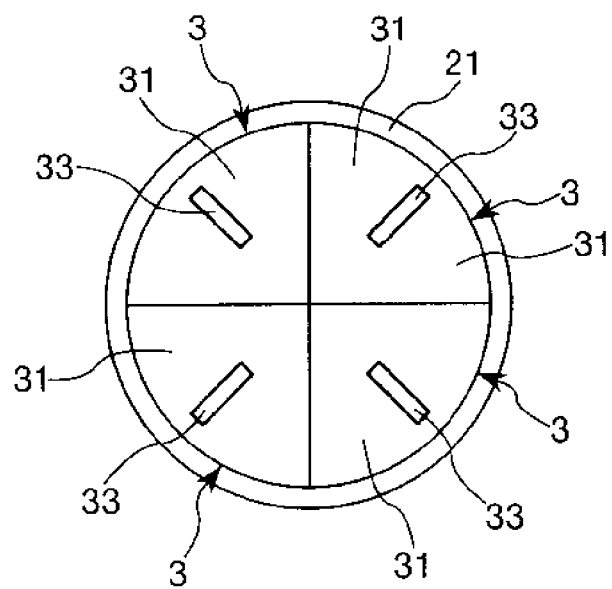
FIG. 5 is a plan view showing a state that the agitating members are inserted in a container of the agitating and mixing device.
Figure 6:
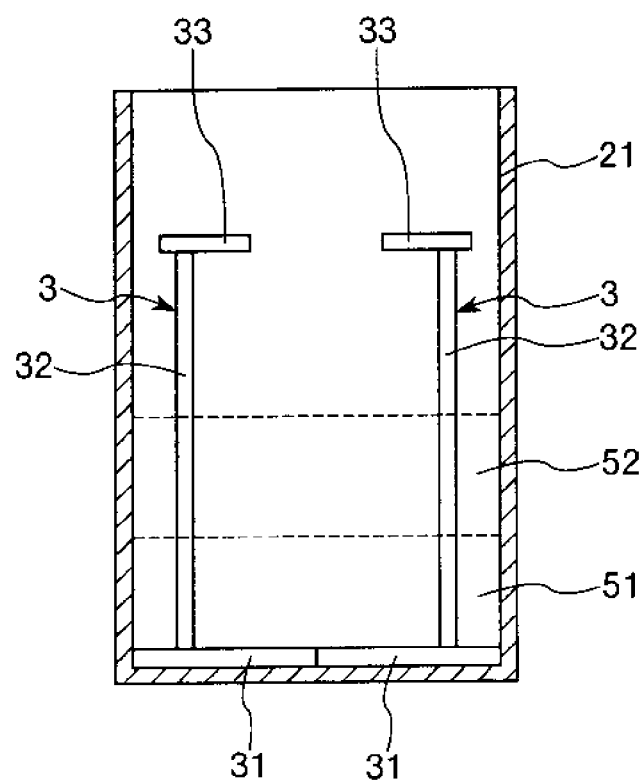
FIG. 6 is a cross sectional view showing a state that a first composition and a second composition are stored in the container of the agitating and mixing device shown in FIG. 1.

FIG. 1 is a view showing a producing process of a resin composition. FIG. 2 is a side view (partial cross section view) showing an agitating and mixing device according to one embodiment of the present invention. FIG. 3 is a perspective view showing the agitating and mixing device shown in FIG. 1. FIG. 4 is a perspective view showing an agitating member of the agitating and mixing device shown in FIG. 1. FIG. 5 is a plan view showing a state that the agitating members are inserted in a container of the agitating and mixing device. FIG. 6 is a cross sectional view showing a state that a first composition and a second composition are stored in the container of the agitating and mixing device shown in FIG. 1.

In the following description, the upper side of FIGS. 2, 3, 4 and 6 will be referred to as "upper", the lower side will be referred to as "lower", the left side will be referred to as "left" and the right side will be referred to as "right".

An agitating and mixing device 1 shown in FIG. 2 is a device used in an agitating process and a mixing process to produce a resin composition as a molded body (compact). Prior to describing the agitating and mixing device 1, description will be first given to the overall producing process which begins with the supply of a raw material and ends with the production of a semiconductor sealing resin composition.

At first, individual materials as raw materials of a resin composition are prepared. The raw materials include a resin, a curing agent and a filler material (inorganic filler material, fine particle). If necessary, the raw materials may further include a curing accelerator and a coupling agent. It is preferable to use an epoxy resin as the resin.

Examples of the epoxy resin include a cresol novolac type epoxy resin, a biphenyl type epoxy resin, a dicyclopentadiene type epoxy resin, a triphenol methane type epoxy resin and a multi-ring aromatic type epoxy resin.

Examples of the curing agent include a phenol novolac type resin, a phenol aralkyl type resin, a triphenol methane type resin and a multi-ring aromatic resin.

Examples of the filler material include a fused silica (having a crushed shape or a spherical shape), a crystalline silica and an alumina.

Examples of the curing accelerator include a phosphor compound and an amine compound. Examples of the coupling agent include a silane compound and so forth.

Specific one of the materials stated above may be excluded from the raw material. Other materials than set forth above may be further included in the raw materials. Examples of the other materials include a coloring agent, a releasing agent, a stress-reducing agent and a flame retardant.

Examples of the flame retardant include a borominated epoxy resin, an antimony oxide-based flame retardant, a non-halo- and non-antimony-based flame retardant. Examples of the non-halo- and non-antimony-based flame retardant include an organic phosphor, a metal hydrate and a nitrogen-containing resin.

(Fine Pulverization)

As shown in FIG. 1, specific materials among the raw materials are first pulverized (finely pulverized) by a first pulverizing apparatus to have a specified particle size distribution. Examples of the raw materials to be pulverized include the resin, the curing agent, the curing accelerator and other materials except the filler materials. A part of the filler materials may be added into the raw materials to be pulverized. As a result, a first composition including plural kinds of pulverized materials such as a resin particle is obtained. As the first pulverizing apparatus, it is possible to use a continuous rotary ball mill, a gas stream type pulverizing apparatus or the like.

A specified material among the raw materials, for example, all or part of the filler materials (the remainder of the filler materials), is subjected to a surface treatment. In the surface treatment, for example, the coupling agent adheres to a surface of the filler material. As a consequence, a second composition including an inorganic particle (powder material) which is the filler material is obtained. The fine pulverization and the surface treatment may be performed either simultaneously or one after the other.

(Agitation)

Next, the first composition obtained in the fine pulverization process and the second composition obtained in the surface treatment process, namely, the resin compositions (composition) including plural kinds of pulverized materials are agitated and roughly mixed by the agitating and mixing device 1. Each of the pulverized materials has a different specific gravity. The agitating and mixing device 1 will be described later.

(Mixing)

Next, the resin composition roughly mixed is thoroughly mixed by the agitating and mixing device 1.

(Kneading)

Next, the resin composition thus mixed is kneaded by a kneading device. As the kneading device, it is possible to use a kneading extruder such as a single-axis type kneading extruder or a double-axis type kneading extruder, or a roll type kneader such as a mixing roll and so forth.

(Degassing)

Next, the resin compositions thus kneaded are degassed by a degassing device.

(Sheet Making)

Next, the resin compositions thus degassed are molded into a sheet shape by a sheet-making device. As a result, a sheet-shaped resin composition is obtained. As the sheet-making device, it is possible to use a sheet-making roll and so forth.

(Cooling)

Next, the sheet-shaped resin composition is cooled by a cooling device. This makes it possible to easily and reliably perform pulverization of the sheet-shaped resin composition.

(Pulverization)

Next, the sheet-shaped resin composition is pulverized by a second pulverizing apparatus to have a specified particle size distribution. As a result, pulverized resin compositions are obtained. As the second pulverizing apparatus, it is possible to use a hammer mill, a grindstone type mill or a roll crusher.

The granular or pulverized resin compositions may be obtained not by the sheet-making, cooling and pulverizing process but by, e.g., a hot cutting method in which a die having a small diameter is installed in the outlet of a kneading extruder and a molten resin composition discharged from the die is cut by a cutter into granular resin compositions having a specified length. In this case, after obtaining the granular resin compositions by the hot cutting method, it is preferable to perform degassing while the temperature of the granular resin compositions remains high.

(Tablet Making)

Next, the pulverized resin compositions are compression-molded by a compact manufacturing device (tablet-making device) to obtain resin composition in the form of compacts.

The resin composition is used for, for example, covering (sealing) a semiconductor chip (semiconductor element). In other words, the resin composition is molded by, e.g., a transfer molding method and then the semiconductor chip is covered with the molded resin composition as a sealing material, thus manufacturing a semiconductor package.

The tablet-making process may be omitted and the pulverized resin compositions may be used as final products. In this case, the pulverized resin compositions are molded by, for example, a compression-molding or an injection-molding method to form a sealing material.

Next, description will be given to the agitating and mixing device 1. As shown in FIGS. 2 through 5, the agitating and mixing device is a device for mixing the resin composition (composition) containing plural kinds of pulverized materials. Each of the pulverized materials has a different specific gravity. The agitating and mixing device 1 comprises a container 2 for storing the composition, an agitating member 3 for agitating the composition, which is inserted (provided) in the container 2 and a driving device (driving means) 4 for vibrating (swinging) the container 2. The agitating and mixing device 1 first agitates the resin composition stored in the container 2 using the agitating member 3 and then mixes the resin composition stored in the container 2 by vibrating the container 2 using the driving device 4. The resin composition contains a resin particle and an inorganic particle as the plural kinds of pulverized materials.

The driving device 4 has a base 44, a slider 43, a holder (holding portion) 45 for detachably holding the container 2, a first vibration mechanism (first driving mechanism) 41 for vibrating the holder 45 at a first predetermined direction and a second vibration mechanism (second driving mechanism) for vibrating the slider 43 at a second predetermined direction differing from the first predetermined direction.

The holder 45 has a shape corresponding to the container 2 so that the holder 45 can detachably hold the container 2. In the configuration shown in the drawings, the holder 45 has a circular cylindrical shape (cylindrical shape) having a bottom surface and a projection portion 451 projecting from a circumference surface of the holder 45 toward the left side.

The first vibration mechanism 41 has a motor 410 having a rotating shaft 411. An end portion of the rotating shaft 411 is connected with an end portion of the projection portion 451. A transmission (not shown) may be provided between the rotating shaft 411 and the projection portion 451.

The motor 410 is configured to alternately rotate the rotating shaft 411 in a clockwise direction and a counter-clockwise direction by a predetermined angle.

By actuation of the motor 410, the rotating shaft 411 is alternately rotated in the clockwise direction and the counter-clockwise direction by the predetermined angle. In other words, the rotating shaft 411 is vibrated at a rotation direction. As a result, the holder 45 is alternately rotated in the clockwise direction and the counter-clockwise direction by the predetermined angle together with the rotating shaft 411. In other words, the holder 45 is vibrated at the rotation direction around the rotating shaft 411 as a rotation center. When the container 2 is held in the holder 45, the container 2 is vibrated in the rotation direction around the rotating shaft 411 together with the holder 45.

A rail 421 is provided on the base 44 and extends along a left-right direction in FIG. 2. In other words, the rail 421 is provided on the base 44 in a state that a longitudinal direction of the rail 421 is parallel to the projection portion 451 and the rotating shaft 411 of the motor 410.

The slider 43 is slidably provided on the base 44 in the longitudinal direction of the rail 421 (the left-right direction in FIG. 2). The motor 410 is attached to the slider 43. The motor 410 and the holder 45 can be moved along the longitudinal direction (left-right direction) of the rail 421 together with the slider 43.

The second vibration mechanism 42 has the rail 421, a motor (not shown) and driving force transmitting device (not shown) for transmitting a driving force from the motor to the slider 43.

The drive force transmitting device of the second vibration mechanism 42 is configured to move the slider 43 along the longitudinal direction of the rail 421 using the drive force from the motor. The motor of the second vibration mechanism 42 is configured to control the slider 43 so as to alternatively move the slider 43 in the left direction and the right direction along the rail 421 by a predetermined distance.

When the motor of the second vibration mechanism 42 drives, the slider 43 is alternatively moved in the left direction and the right direction along the rail 421 by the predetermined distance. In other words, the slider 42 is vibrated in the longitudinal direction (left-right direction in FIG. 2) of the rail 421. As a result, the motor 410 of the first vibration mechanism 41 and the holder 45 are alternatively moved in the left direction and the right direction along the rail 421 by the predetermined distance together with the slider 43. In other words, the motor 410 of the first vibration mechanism 41 and the holder 45 are moved in the longitudinal direction (left-right direction in FIG. 2) of the rail 421 together with the slider 43. When the container 2 is held in the holder 45, the container 2 is vibrated in the longitudinal direction (left-right direction in FIG. 2) of the rail 421 together with the holder 45.

As described above, the holder 45 and the container 2 held in the holder 45 are simultaneously vibrated in two directions, that is, the rotation direction and the left-right direction by the first vibration mechanism 41 and the second vibration mechanism 42. As a result, the resin composition stored in the container 2 is mixed. A rotating blade type mixing device, such as a henschel mixer or the like, which rotates a rotating blade at high speed to mix the resin composition, suffers from a scratch problem by the rotating blade against an inner surface of the container 2. In contrast, in the agitating and mixing device 1, the resin composition is mixed by vibrating the container 2. Therefore, the agitating and mixing device 2 does not suffer from the scratch problem. This makes it possible to prevent (inhibit) metallic foreign substances (foreign metals) from being mixed into the resin composition during mixing.

It is not necessary that the driving device 4 has two vibration mechanisms. The driving device 4 may have only one vibration mechanism which can vibrate in the two directions.

The container 2 can be hermetically sealed. The container 2 has a main body 21 for storing the resin composition and a cover cap 22 detachably attached to the main body 21. Namely, the container 2 is configured to hermetically seal (fluid-tightly seal) an inside of the main body 21 (container 2) in a state that the cover cap 22 is attached to the main body 21. The main body 21 has a circular cylindrical shape (cylindrical shape) having a bottom surface.

In the configuration shown in the drawings, the agitating and mixing device 1 has plural (four) agitating members 3. Each of the agitating members 3 has a rod-like portion 32 having one end portion and another end portion, a plate-like portion 31 provided on the one end portion of the rod-like portion (the lower side in FIG. 4), a grip portion 33 provided on the other end portion of the rod-like portion 32 (the upper side in FIG. 4). The plate-like portion 31 is provided on the one end portion of the rod-like portion 32 in a state that the plate-like portion 31 is perpendicular to the rod-like portion 32.

In the configuration shown in the drawings, the plate-like portion 31 of each of the agitating members 3 has a same (identical) shape as a shape of a piece which could be obtained by dividing a plate-like member having the same shape and size as the bottom surface (having a circular shape) of main body 21 (container 2) into plural (four) pieces. In this case, each of the plate-like portions 31 has the same shape and size as the shape of the piece which could be obtained by dividing the plate-like member into plural pieces equiangularly (by 90 degrees). In other words, each of the plate-like portions 31 has a same fan shape and each of the fan shapes of the plate-like portions 31 has a same central angle (90 degree).

Each agitating member 3 is configured to agitate the resin composition by spacing each plate-like portion 31 apart from the bottom surface of the main body 21. The agitating member 3 is first provided in the main body 21 so as to contact its plate-like portion 31 with the bottom surface of the main body 21. And then, the agitating member 3 is spaced apart from the bottom surface of the main body 21 by pulling the agitating member 3 up from the container 2 (main body 21). As a result, the resin composition is agitated and roughly mixed by the plate-like portion 31.

When all of the agitating members 3 are provided in the main body 21 so as to contact its plate-like portion 31 with the bottom surface of the main body 21, an overall shape of the plate-like portions 31 of the agitating members 3 (a shape formed by coupling all of the plate like portions 31) has a same shape as the shape of the bottom surface of the main body 21. This makes it possible to agitate the resin composition stored in the main body 21 without omission.

A constituent material of the container 2 is not particularly limited to a specific material, but it is preferred that at least the inner surface of the container 2 is constituted of a nonmetallic material. In this case, whole of the container 2 may be constituted of the nonmetallic material.

A constituent material of the agitating member 3 is not particularly limited a specific material, but it is preferred that at least a surface of the agitating member 3 is constituted of a nonmetallic material. In this case, whole of the agitating member 3 may be constituted of the nonmetallic material.

This makes it possible to prevent the metallic foreign substances from being mixed into the resin composition during agitating and mixing the resin composition, thereby preventing a short circuit when the semiconductor chip is sealed by the produced resin composition. Specifically, this makes it possible to decrease an increasing rate of metallic substances in the resin composition less than 1.0 wtppm after the agitating and mixing device 1 agitates and mixes the resin composition, more specifically, less than 0.1 wtppm.

The nonmetallic material is not particularly limited to a specific material. Examples of such nonmetallic material include a ceramic material such as an alumina or a zirconia, a material coated on its surface with a resin material such as a rubber or a nylon and the like. Among these nonmetallic materials, the material coated on its surface with the resin material is preferably used.

The number of the agitating member 3 is not limited to be four. The number of the agitating member 3 may be in the range of one to three or more than or equal to five. But the number of the agitating member 3 is preferably plural. This makes it possible to easily, quickly and reliably agitate the resin composition.

Next, description will be given to the agitating process and the mixing process as well as an actuation of the agitating and mixing device 1 in the agitating process and the mixing process.

(Agitating Process)

In the agitating process (pre-agitating process), the agitating and mixing device 1 agitates the pulverized resin composition, namely, the first composition obtained in the finely Pulverization process and the second composition obtained in the surface treatment process.

At first, each of the agitating members 3 is inserted in the main body 21 and placed on (provided on) the bottom surface of the main body 21 so as to contact the plate-like portions 31 with the bottom surface of the main body 21. In this state, the overall shape of the plate-like portions 31 of the agitating members 3 has the same shape as the shape of the bottom surface of the main body 21.

Next, the resin composition is stored in the main body 21. In this case, one of the first composition and the second composition is first stored in the main body 21 and then the other is stored in the main body 21 so as to be placed on the one. As a result, the resin composition is stored in the main body 21 in a state that the resin composition is divided into a first layer 51 formed by the first composition containing the resin particle and a second layer 52 formed by the second composition containing the inorganic particle (filler material).

Either the first layer 51 or the second layer 52 may be placed under the other (in the configuration shown in the drawings, the first layer 51 is placed under the second layer 52), but it is preferred that the one which has a less specific gravity than a specific gravity of the other is placed under the other. This makes it possible to uniformly mix the resin composition at short time in the mixing process detailed in the following description.

Next, each of the agitating members 3 is one by one pulled up from the main body 21. An order of pulling the agitating members 3 is not particularly limited to a specific order. Examples of the order include a clockwise order and a counter-clockwise order. The plate-like portions 31 are spaced apart from the bottom surface of the main body 21 by pulling the agitating members 3 up from the main body 21. In so doing, the resin composition divided into the first layer 51 and the second layer 52 is agitated and roughly mixed by the plate-like portions 31. This makes it possible to uniformly mix the resin composition at short time in the mixing process.

When the agitating members 3 are pulled up from the main body 21, the resin composition remaining on the plate-like portions 31 is returned to the main body 21 by sloping the plate-like portions 31 and then using a device such as a spatula and so forth.

When the agitating members 3 are pulled up from the main body 21, it is preferred that the agitating members 3 are moved in a vertical direction (a longitudinal direction of the rod-like portion 32).

When the agitating members 3 are pulled up from the main body, the agitating members 3 may be rotated around an axis of the rod-like portion 32.

(Mixing Process)

In the mixing process (main mixing process), the agitating and mixing device 1 mixes the resin composition agitated (roughly mixed) in the agitating process.

At first, the cover cap 22 is attached to the main body 21 and then the main body 21 is hermetically sealed. Next, the container 2 is mounted and held in the holder 45 of the driving device 4 and then the driving device drives. As a result, the container 2 is simultaneously vibrated in the two directions, that is, the rotation direction of the rotating shaft 411 and the left-right direction in FIG. 2 by the first vibration mechanism 41 and the second vibration mechanism 42. The cover cap 22 may be integrated with the holder 45.

The number of vibrations (frequency) in each of the directions are not particularly limited, but is preferably in the range of about 5 to 8 cycle per second, and more preferably in the range of about 6 to 8 cycle per second. The number of vibrations in each of the directions may be either equal to or different from one another.

A mixing time is not particularly limited to a specific time, but is preferably in the range of about 1 to 7 minutes, and more preferably in the range of about 3 to 5 minutes. If the mixing time is shorter than the above lower limit, a degree of mixing may become insufficient. On the other hand, if the mixing time is longer than the above upper limit, a temperature of contents rises more than necessary. Both cases are undesirable for mixing the resin composition.

Due to the mixing process, the resin composition is uniformly mixed. A standard deviation described in the following description is measured as a degree of uniformity. The following standard deviation is preferably less than or equal to 0.2, and more preferably in the range of about 0.0 to 0.1.

The standard deviation is measured as the following process. At first, six samples of the resin composition are respectively picked out from six different points of the resin composition after mixing process. Then, each of the samples is burned to an ash. At last, the standard deviation of weight fraction among the ashes (a dispersion of the ashes) is measured.

While the agitating and mixing device and the method for producing the semiconductor sealing resin composition of the present invention have been described above based on the illustrated embodiments, the present invention is not limited thereto. The configuration of the respective components may be substituted by arbitrary configurations having the same or equivalent functions. In addition, other arbitrary configurations or process may be added to the present invention.

In the embodiment described above, the agitating and mixing device 1 is configured to simultaneously vibrate the container 2 in the two directions, but the present invention is not limited thereto. In the mixing process, the agitating and mixing device 1 may be configured to vibrate the container 2 in one direction or simultaneously vibrate the container 2 in more than or equal to three directions.

As set forth above, the agitating and mixing device 1 is capable of preventing the metallic foreign substances from being mixed into the resin composition. This makes it possible to prevent the short circuit when the semiconductor chip is sealed by the produced resin composition.

In the agitating and mixing device 1 of the present invention, the agitating member 3 agitates the resin composition stored in the container 2 before mixing the resin composition by vibrating the container 2. This makes it possible to easily mix the resin composition. As a result, it is possible to reduce the mixing time.

EXAMPLES

Nest, description will be given on specific examples of the present invention.

<Raw Materials of the First Composition>

The raw materials of the first composition used include:

7.1 parts by weight of biphenyl type epoxy resin (YX4000H produced by Yuka Shell Epoxy Co., Ltd., which has a melting point of 105° C. and an epoxy equivalent of 195);

6.4 parts by weight of phenol aralkyl resin (XLC-3L produced by Mitsui Chemicals, Inc., which has a melt viscosity of 2.0 poises at 150° C. and a hydroxyl equivalent of 172);

0.2 parts by weight of 1,8-diazabicyclo (5,4,0) undecene-7;

20.0 parts by weight of fused silica;

0.5 parts by weight of carnauba wax; and 0.3 parts by weight of carbon black.

<Raw Materials of the Second Composition>

The raw materials of the second composition used include:

63.0 parts by weight of fused silica (having an average particle size of 16 µm); and 0.5 parts by weight of epoxy silane coupling agent (γ-glycidoxy propyl trimethoxy silane).

[1] Production of the First Composition

The first composition was obtained by pulverizing the raw materials of the first composition described above and adjusting a particle size distribution in the following range using a continuous rotary ball mill.

The particle size distribution was in a state that 0 wt % of particles of the first composition have a particle size of more than or equal to 250 µm, 2 wt % of the particles have a particle size of more than or equal to 150 µm to less than 250 µm, and 98 wt % the particles have a particle size of less than 150 µm.

[2] Production of the Second Composition

The second composition was obtained by attaching the epoxy silane coupling agent to a surface of the fused silica using a ribbon blender.

Example 1

The pulverized resin compositions were obtained by mixing the first composition and the second composition using the agitating and mixing device 1 in the following manner.

At first, the first composition was stored in the main body 21 in a state that the four agitating member 3 were inserted in the main body 21, and then the second composition was stored in the main body 21 so as to be provided (placed) on the first composition. As a result, the first layer 51 constituted of the first composition was formed as a lower layer and the second layer 52 constituted of the second composition was formed on the first layer 51 as an upper layer.

Next, the resin composition stored in the main body 21 was agitated by one by one pulling each of the agitating members 3 up from the main body 21 in a clockwise order. A square measure of an upper surface of the plate-like portion 31 of each of the agitating members 3 was 380 cm$^2$ and a speed of pulling up is 0.2 m/s.

Next, the cover cap 22 was attached to the main body 21 and the main body 21 was hermetically sealed. And then, the container was held in the holder 45 of the driving device 4 and the driving device 4 drives. As a result, the resin composition was mixed by simultaneously vibrating the container 2 in the two directions. A mixing condition was: 7 cycle per second of the number of vibration in the rotating direction of the rotating shaft 411; 7 cycle per second of the number of vibration in the left-right direction in FIG. 2; and 3 minutes of the mixing time.

Comparative Example 1

A resin composition was obtained in the same manner as in the example 1, except that the agitating members 3 did not agitate the resin composition.

Comparative Example 2

A resin composition was obtained in the same manner as in the example 1, except that the agitating members 3 agitated the resin composition once and the driving device 4 did not mix the resin composition by vibrating the container 2.

Comparative Example 3

A resin composition was obtained in the same manner as in the example 1, except that the agitating members 3 did not agitate the resin composition and the mixing time is 8 minutes.

[Evaluation]

Uniformities of the resin compositions obtained in example 1 and in comparative examples 1, 2 and 3 were evaluated in the following manner.

At first, six samples of the resin composition were obtained in the following manner. The six samples were respectively picked out from six different points of the resin composition stored in the container 2 after mixing. Each of the six samples had a weight of 3 g. The six points are respectively a point on a top end and a circumference, a point on the top end and a center, a point on a midportion and the circumference, a point on the midportion and the center, a point on a lower end and the circumference and a point on the lower end and the center of the resin composition.

Next, each of the samples is heat-treated at 700° C. for 180 minutes using an oven. Then, gravities of each of ashes remained after heat-treating was measured and standard deviation among the ashes was measured.

The standard deviation of the ash obtained in the example 1 is 0.04 and a temperature of the mixture is 25° C.

The standard deviation of the composition obtained in the comparative example 1 is 0.25 and a temperature of the mixture is 25° C.

The standard deviation of the ash obtained in the comparative example 2 is 9.03 and a temperature of the mixture is 20° C.

The standard deviation of the ash obtained in the comparative example 3 is 0.10 and a temperature of the mixture is 30° C.

From the above evaluation results, the uniformity of the mixed resin composition obtained in the example 1 is satisfactory. In contrast, the uniformity of the mixed resin composition obtained in the comparative example 1 in which the agitating members 3 did not agitate is unsatisfactory. Similarly, the uniformity of the mixed resin composition obtained in the comparative example 2 in which the agitating member 3 agitated the resin composition once and the driving device 4 did not mix the resin composition is unsatisfactory. The uniformity of the mixed resin composition obtained in the comparative example 3 in which the agitating members 3 did not agitate the resin composition is satisfactory because the mixing time is sufficiently long. However, there is a case in which a temperature of the mixture rises more than necessary, thereby a problem in that the resin composition is cemented occurs.

INDUSTRIAL APPLICABILITY

With the present invention, it is possible to prevent metallic foreign substances from being mixed into the composition because the composition is mixed by vibrating the container. This makes it possible to prevent the short circuit when the semiconductor chip is sealed by the produced composition. Further, the agitating and mixing device of the present invention agitates the composition stored in the container using the agitating member before the agitating and mixing device mixes the composition by vibrating the container. This makes it possible to easily mix the resin composition. As a result, it is possible to reduce the mixing time. For the reasons stated above, the present invention is industrially applicable.

What is claimed is:

1. An agitating and mixing device for mixing a composition containing plural kinds of pulverized materials, each of the pulverized materials having a different specific gravity, the agitating and mixing device comprising:
    a container for storing the composition, the container having a bottom surface;
    a plurality of agitating members for agitating the composition, each of the agitating members having a plate-like portion and inserted in the container so that the plate-like portion of each of the agitating members is placed on the bottom surface of the container; and
    a driving device for vibrating the container,
    wherein the agitating and mixing device is configured to agitate the composition stored in the container using the agitating members and then to mix the composition by vibrating the container using the driving device, and
    wherein the agitating members are configured to agitate the composition when each of the agitating members is pulled up one by one from the bottom surface of the container.

2. The agitating and mixing device as claimed in claim 1, wherein the plate-like portions of the agitating members placed on the bottom surface of the container form the same shape as the bottom surface of the container.

3. The agitating and mixing device as claimed in claim 1, wherein each of the agitating members has a rod-like portion having one end portion and another end portion, and the plate-shape portion of each of the agitating members is provided on the one end portion of the rod-like portion of each of the agitating members.

4. The agitating and mixing device as claimed in claim 3, wherein the plate-shape portion of each of the agitating members is perpendicular to the rod-like portion of each of the agitating members.

5. The agitating and mixing device as claimed in claim 1, wherein the driving device is configured to simultaneously vibrate the container in at least two directions.

6. The agitating and mixing device as claimed in claim 1, wherein at least an inner surface of the container is constituted of a nonmetallic material.

7. The agitating and mixing device as claimed in claim 1, wherein at least an outer surface of the agitating member is constituted of a nonmetallic material.

8. The agitating and mixing device as claimed in claim 1, wherein the composition contains a resin particle and an inorganic particle as the plural kinds of pulverized materials.

9. The agitating and mixing device as claimed in claim 1, wherein the composition is stored in the container in a state that the composition is separated into a first layer which is placed on the plate-like portions of the agitating members and contains a resin particle and a second layer which is placed on the first layer and contains an inorganic particle and then the composition is agitated by pulling up one by one the agitating members from the bottom surface of the container.

10. The agitating and mixing device as claimed in claim 9, wherein the container contains the composition so that a specific gravity of the first layer is less than a specific gravity of the second layer.

* * * * *